(12) United States Patent
Yang et al.

(10) Patent No.: US 10,148,598 B2
(45) Date of Patent: *Dec. 4, 2018

(54) EFFICIENT PACKET PROCESSING AT VIDEO RECEIVER IN MULTIMEDIA COMMUNICATIONS OVER PACKET NETWORKS

(71) Applicant: Dialogic Corporation, Montreal (CA)

(72) Inventors: Kyeong Ho Yang, Freehold, NJ (US); Myo Tun, Randolph, NJ (US)

(73) Assignee: Dialogic Corporation, Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/455,546

(22) Filed: Mar. 10, 2017

(65) Prior Publication Data

US 2017/0187651 A1    Jun. 29, 2017

Related U.S. Application Data

(63) Continuation of application No. 14/186,239, filed on Feb. 21, 2014, now Pat. No. 9,628,411.

(51) Int. Cl.
*H04L 12/939* (2013.01)
*H04L 1/16* (2006.01)
(Continued)

(52) U.S. Cl.
CPC .......... *H04L 49/552* (2013.01); *H04L 1/1621* (2013.01); *H04L 1/1809* (2013.01);
(Continued)

(58) Field of Classification Search
CPC .................................................. H04L 49/552
See application file for complete search history.

(56) References Cited

U.S. PATENT DOCUMENTS 5,928,330 A    7/1999    Goetz et al.
6,006,253 A *  12/1999   Kumar ............... H04N 7/152
                                                 348/E7.084
(Continued)

OTHER PUBLICATIONS

Packet Loss Probability for Real-Time Wireless communications; Kelvin; 2002.*

(Continued)

*Primary Examiner* — Eileen M Adams
*Assistant Examiner* — Luis Perez-Fuentes
(74) *Attorney, Agent, or Firm* — BainwoodHuang

(57) ABSTRACT

Systems and methods of handling packet errors associated with multimedia data received at data receivers from data senders, in which packet error feedback information is provided by the data receivers to the data senders in one or more real-time transport control protocol (RTCP) feedback packets. The data receivers can calculate, determine, or otherwise obtain costs associated with providing specific forms of packet error feedback information in the RTCP feedback packets, and further calculate, determine, or otherwise obtain wait times for handling out-of-order packets, as well as receiving retransmissions of lost packets. By handling packet errors associated with multimedia data while taking into account such costs and wait times, each of which can have an impact on system bandwidth and/or latency, the systems and methods can more reliably achieve the quality of experience (QoE) generally desired and/or required for multimedia data transmissions.

19 Claims, 6 Drawing Sheets

(51) Int. Cl.
*H04L 29/06* (2006.01)
*H04N 21/442* (2011.01)
*H04N 21/6375* (2011.01)
*H04N 21/6437* (2011.01)
*H04L 1/18* (2006.01)

(52) U.S. Cl.
CPC .......... *H04L 1/1838* (2013.01); *H04L 1/1848* (2013.01); *H04L 65/608* (2013.01); *H04L 65/80* (2013.01); *H04N 21/44209* (2013.01); *H04N 21/6375* (2013.01); *H04N 21/6437* (2013.01)

(56) References Cited

U.S. PATENT DOCUMENTS

| | | | |
|---|---|---|---|
| 6,275,471 | B1 | 8/2001 | Bushmitch et al. |
| 6,658,019 | B1 | 12/2003 | Chen et al. |
| 7,305,486 | B2 * | 12/2007 | Ghose ................... H04L 1/1809 370/235 |
| 7,331,008 | B2 * | 2/2008 | Cheng ................... H04L 1/1867 714/748 |
| 8,224,885 | B1 | 7/2012 | Douchette et al. |
| 8,675,524 | B2 | 3/2014 | Karam et al. |
| 9,210,381 | B2 * | 12/2015 | Yang ...................... H04N 7/152 |
| 9,344,218 | B1 * | 5/2016 | Liu ......................... H04L 1/0045 |
| 9,628,411 | B2 * | 4/2017 | Yang ................ H04N 21/44209 |
| 9,876,612 | B1 * | 1/2018 | Maveli ....................... H04L 1/08 |
| 2015/0244650 | A1 * | 8/2015 | Yang ................ H04N 21/44209 348/180 |
| 2017/0187651 | A1 * | 6/2017 | Yang ................ H04N 21/44209 |

OTHER PUBLICATIONS

Packet Loss Probability for Bursty Wireless Real-Time traffic through dealy model; Kelvin; 2004.*

Alvestrand, H., "RTCP Message for Receiver Estimated Maximum Bitrate", Internet Draft—Google; 8 pages; dated Oct. 21, 2013.
Even, Re., "RTP Payload Format for H.261 Video Streams", RCP 4587—Polycom; 17 pages; dated Aug. 2006.
Hadizadeh, H., et al., "Video Error Concealment Using a Computation-Efficient Low Saliency Prior", IEEE Transactions on Multimedia, 15(8):2099-2113, Dec. 2013.
Huitema, C., "Real Time Control Protocol (RTCP) Attribute in Session Description Protocol (SDP)", RFC 3605—Microsoft; 8 pages; dated Oct. 2003.
Johansson, I., et al. "Support for Reduced-Size Real-Time Transport Control Protocol (RTCP): Opportunities and Consequences", RFC 5506; 17 pages; dated Apr. 2009.
Ott, J., et al., "Extended RTP Profile for Real-Time Transport Control Protocol (RTCP)—Based Feedback (RTP/AVPF)"; RFC 4585—Helsinki University of Technology; 51 pages; dated Jul. 2006.
No Author Given, "RTP Payload Format for H.264 Video" downloaded on May 19, 2016; URL: http://www.rfc-base.org-6184.html; 2 pages.
Schulzrinne, H., et al., "RTP: A Transport Protocol for Real-Time Applications"; RFC 3550—Columbia University; 33 pages; dated Jul. 2003.
Wenger, S., et al., "Codec Control Messages in the RTP Audio-Visual Profile with Feedback (AVPF)", RFC 5104—Nokia; 64 pages; dated Feb. 2008.
Westin, P., et al., "RTP Payload Format for VP8 Video Draft-IETF-Payload-VP8-10", Internet Draft—Google; 30 pages; dated Oct. 4, 2013.
Weigand, T., et al., "Overview of the H.264/AVC Video Coding Standard", IEEE Transactions on Circuits and Systems for Video Technology, 13(7):560-576, Jul. 2003.
Zhang, Y., et al., "Packet Video Error Concealment with Auto Regressive Model", IEEE Transactions on Circuits and Systems for Video Technology, 22(1):12-27, Jan. 2012.

* cited by examiner

EFFICIENT PACKET PROCESSING AT VIDEO RECEIVER IN MULTIMEDIA COMMUNICATIONS OVER PACKET NETWORKS

CROSS-REFERENCE TO RELATED APPLICATIONS

This application is a continuation of U.S. patent application Ser. No. 14/186,239 filed Feb. 21, 2014 entitled EFFICIENT PACKET PROCESSING AT VIDEO RECEIVER IN MULTIMEDIA COMMUNICATIONS OVER PACKET NETWORKS.

TECHNICAL FIELD

The present application relates generally to systems and methods of multimedia communications that employ the real-time transport protocol (RTP) and the real-time transport control protocol (RTCP), and more specifically to systems and methods of handling packet errors associated with multimedia data received at data receivers from data senders, such as packet errors involving lost packets and/or out-of-order packets, and providing packet error feedback information in one or more RTCP feedback packets from the data receivers to the data senders for possible retransmission of the lost packets and/or one or more intra-coded frames.

BACKGROUND

In recent years, multimedia communications over the Internet and other wired and/or wireless communications networks have gained increased popularity. For example, such multimedia communications can be performed within the context of video conferencing systems, in which multipoint control units (MCUs) are employed to facilitate collaboration among groups of conference participant devices by performing various functions including mixing, synchronizing, encoding, decoding, and transcoding video and/or audio data bitstreams generated by the respective conference participant devices.

In such video conferencing systems, successful transmissions of multimedia data between the MCUs and the conference participant devices over communications networks generally require sufficient bandwidth and low latency for minimal packet loss. The MCUs and the conference participant devices are each operative to send and receive multimedia data. Such transmissions of multimedia data between the MCUs and the conference participant devices are typically based on the real-time transport protocol (RTP), and delivery of such multimedia data to the respective MCUs and conference participant devices is typically monitored using the real-time transport control protocol (RTCP). For example, an MCU or conference participant device that receives multimedia data in the form of RTP packets can provide packet error feedback information to the sender of the multimedia data in one or more RTCP feedback packets.

Multimedia communications can be problematic, however, particularly when transmissions of multimedia data are performed over communications networks such as the Internet. For example, when video conferencing is performed over the Internet, various conference participant devices may be subjected to different levels of network congestion, which can result in reduced bandwidth, increased latency, and ultimately increased packet losses, which can severely degrade the multimedia quality of experience (QoE) for conference participants. Moreover, conventional approaches that employ RTCP feedback packets for providing packet error feedback information to senders of multimedia data for use in possible retransmission of lost packets and/or possible transmission of intra-coded frames have heretofore been incapable of reliably achieving the QoE generally desired and/or required for multimedia data transmissions.

SUMMARY

In accordance with the present application, systems and methods of handling packet errors associated with multimedia data received at data receivers from data senders are disclosed, in which packet error feedback information is provided by the data receivers to the data senders in one or more real-time transport control protocol (RTCP) feedback packets. In the disclosed systems and methods, the data receivers can calculate, determine, or otherwise obtain costs associated with providing specific forms of packet error feedback information in the RTCP feedback packets, and further calculate, determine, or otherwise obtain wait times for handling out-of-order packets, as well as receiving retransmissions of lost packets. By handling packet errors associated with multimedia data while taking into account such costs and wait times, each of which can have an impact on system bandwidth and/or latency, the disclosed systems and methods can more reliably achieve the quality of experience (QoE) generally desired and/or required for multimedia data transmissions.

In one aspect, a system for handling packet errors associated with multimedia data received at data receivers from data senders includes a data receiver communicably coupleable to one or more data senders over at least one communications network. For example, the system may be a video conferencing system or any other suitable multimedia communications system. Further, the data receiver may be a multipoint control unit (MCU) or any other suitable multimedia communications server or client, and the data senders may be conference participant devices or any other suitable multimedia communications clients or servers. In an exemplary aspect, the data receiver includes a packet receiver, a packet transmitter, a bandwidth estimator for estimating an available bandwidth from a respective data sender to the data receiver, a feedback message generator, a wait time calculator, and a real-time transport protocol (RTP) packet processor. In a further exemplary aspect, the packet receiver includes an RTP/RTCP packet decoder, a jitter buffer, and a bandwidth estimation parameter calculator. In another exemplary aspect, the feedback message generator includes a feedback message cost calculator.

The disclosed system is operative to perform receptions of multimedia data based on the RTP, and to provide packet error feedback relating to such receptions of multimedia data using the RTCP. For example, the respective data sender can send such multimedia data to the data receiver in the form of RTP packets (e.g., video, audio, and/or data RTP packets). Further, the data receiver can receive the RTP packets, and provide packet error feedback information to the respective data sender in the form of RTCP feedback packets. The data sender can likewise provide, at a specified RTCP transmission interval, round trip delay information to the data receiver in the form of RTCP sender report (SR) packets.

Having received the RTP packets and one or more RTCP SR packets from the respective data sender at the data receiver, the packet receiver can employ the RTP/RTCP packet decoder for decoding the respective RTP/RTCP SR packets, and can further employ the jitter buffer for storing at least the decoded RTP packets, each of which has an associated sequence number. The packet receiver can inspect the sequence numbers of the decoded RTP packets for detecting, at least at some times, one or more packet errors associated with reception of the respective RTP packets. For example, such packet errors can involve one or more lost packets and/or one or more out-of-order packets. In addition, the packet receiver can employ the RTP packets stored in the jitter buffer to obtain further information, including, but not limited to, a measure of the fullness of the jitter buffer, an estimate of the time when a next intra-coded frame (also referred to herein as an "I-frame") is expected, the type of picture corresponding to a current frame in which one or more lost packets were detected, statistics associated with out-of-order packets, and statistics associated with late and/or retransmitted packets, and can provide this further information to the feedback message generator.

Moreover, the packet receiver can access the round trip delay information provided in the RTCP SR packets by the respective data sender. For example, the round trip delay information can include the last SR timestamp, and the delay since last SR. Such round trip delay information is defined in RTP: *A Transport Protocol for Real-Time Applications*, copyright © The Internet Society, July 2003 (the "RTP document").

The bandwidth estimation parameter calculator within the packet receiver is operative to calculate several bandwidth estimation parameters using the round trip delay information provided in the RTCP SR packets, as well as the RTP packets stored in the jitter buffer. For example, the bandwidth estimation parameter calculator can calculate a current round trip delay and an average round trip delay between the data receiver and the respective data sender, using the round trip delay information provided in the RTCP SR packets. Further, the bandwidth estimation parameter calculator can calculate a current packet loss ratio and an average packet loss ratio, as well as a multimedia data reception rate at the data receiver, using the RTP packets stored in the jitter buffer. For example, the multimedia data reception rate can correspond to a video data reception rate at the data receiver. The bandwidth estimation parameter calculator is further operative to provide the bandwidth estimation parameters to the bandwidth estimator, which uses the bandwidth estimation parameters to obtain an estimate of the available bandwidth from the respective data sender to the data receiver. The bandwidth estimator can set a value of the receiver estimated maximum bitrate (also referred to herein as the "REMB Bitrate") to be equal to the available bandwidth estimate. The REMB Bitrate is defined in *RTCP message for Receiver Estimated Maximum Bitrate*, copyright © 2013 IETF Trust and the persons identified as the document authors. In addition, the bandwidth estimator can determine whether there was any packet loss due to a limitation in the available bandwidth from the respective data sender to the data receiver, and provide an indication of such packet loss to the feedback message generator. The bandwidth estimation parameter calculator also provides the average round trip delay to the wait time calculator.

The data receiver can provide, by the packet transmitter, packet error feedback information pertaining to the packet errors associated with the reception of the RTP packets to the respective data sender in one or more RTCP feedback packets. In an exemplary aspect, such packet error feedback information can take the form of a General Negative Acknowledgment (GNACK) message, or a Picture Loss Indication (PLI) message. For example, such a GNACK message may be provided by the data receiver to identify specific packets that have been detected by the packet receiver as being lost, while such a PLI message may be provided by the data receiver to indicate the loss of an unspecified amount of packets, and to request the respective data sender to transmit an I-frame.

Prior to providing such packet error feedback information to the respective data sender, the feedback message generator determines costs associated with providing the respective GNACK and PLI messages to the respective data sender. In an exemplary aspect, the costs associated with providing the GNACK and PLI messages to the respective data sender each involve several cost factors, including, but not limited to, the average round trip delay, the average packet loss ratio, the fullness of the jitter buffer, the estimate of the time when the next I-frame is expected, and the type of picture corresponding to a current frame in which lost packets were detected. In a further exemplary aspect, the feedback message cost calculator is operative to calculate a higher cost for providing the GNACK message (1) for a longer average round trip delay, (2) if the average packet loss ratio exceeds a predetermined percentage value, (3) if there was packet loss due to a limitation in the available bandwidth from the respective data sender to the data receiver, and/or (4) if the fullness of the jitter buffer exceeds a predetermined percentage of the capacity of the jitter buffer. The feedback message cost calculator is further operative to calculate a lower cost for providing the GNACK message if the type of picture corresponding to a current frame in which lost packets were detected is an I-frame. In another exemplary aspect, the feedback message cost calculator is operative to calculate a higher cost for providing the PLI message if (1) there was packet loss due to a limitation in the available bandwidth from the respective data sender to the data receiver, (2) the estimated time when the next I-frame is expected is determined to be less than a predetermined time period, and/or (3) the type of picture corresponding to a current frame in which lost packets were detected is an I-frame.

In an exemplary mode of operation, the feedback message generator can direct the RTP packet processor to instruct the packet transmitter to provide packet error feedback information to the respective data sender in the form of a GNACK message or a PLI message, based at least on a comparison of the costs associated with providing the respective GNACK and PLI messages, as follows. The feedback message generator determines whether the cost for providing a GNACK message is less than the cost for providing a PLI message, based at least on the various cost factors described herein. In the event the cost of providing a GNACK message is determined to be less than the cost for providing a PLI message, the feedback message generator determines whether the cost of providing a GNACK message is less than a predetermined threshold value. In the event the cost of providing a GNACK message is determined to be less than the predetermined threshold value, the feedback message generator directs the RTP packet processor to instruct the packet transmitter to provide the packet error feedback information to the respective data sender in the form of a GNACK message. Otherwise, if the cost of providing a GNACK message is determined not to be less than the predetermined threshold value, then the RTP packet processor does not instruct the packet transmitter to provide a GNACK message or a PLI message to the respective data sender. Moreover, if the cost of providing a GNACK message is determined not to be less than the cost for providing a PLI message, then the feedback message generator determines whether the cost of providing a PLI message is less than the predetermined threshold value. In the event the cost of providing a PLI message is determined to be less than the predetermined threshold value, the feedback message generator directs the RTP packet processor to instruct the packet transmitter to provide the packet error feedback information to the respective data sender in the form of a PLI message. Otherwise, if the cost of providing a PLI message is determined not to be less than the predetermined threshold value, then the RTP packet processor does not instruct the packet transmitter to provide a GNACK message or a PLI message to the respective data sender. When neither a GNACK message nor a PLI message is provided by the data receiver to the respective data sender, the packet receiver accesses a current RTP packet from the jitter buffer for further processing, and optionally discards any RTP packets subsequently received at the packet receiver that have sequence numbers smaller than that of the current RTP packet. It is noted that, although this exemplary mode of operation employs two different forms of feedback messages, namely, a GNACK message and a PLI message, such a mode of operation may alternatively employ any other suitable feedback messages, and/or any other suitable number (e.g., one or more) of feedback messages. Further, in the event such a mode of operation employs one or more feedback messages, the mode of operation may make a relative comparison of the respective costs associated with providing the feedback messages to a data sender, and/or compare the costs associated with providing the feedback messages to a data sender with any suitable threshold value(s).

The wait time calculator is operative to determine a wait time for handling out-of-order packets, as well as a wait time for receiving retransmissions of lost packets, so as to address a tradeoff between the effective packet loss ratio and the overall system latency. The "effective packet loss ratio" is defined herein as the sum of the number of packets lost and the number of unusable packets stored in the jitter buffer divided by the number of packets expected. In an exemplary aspect, the wait time for handling out-of-order packets involves several wait factors, including, but not limited to, the average round trip delay, the statistics associated with the out-of-order packets (including the percentage of out-of-order packets, and the average delay associated with such out-of-order packets), and the type of picture corresponding to a current frame in which lost packets were detected. In a further exemplary aspect, the wait time calculator is operative to obtain a longer wait time for handling out-of-order packets if the average round trip delay exceeds a predetermined length of time, and a shorter wait time for handling out-of-order packets if the type of picture corresponding to a current frame in which lost packets were detected is an I-frame. The wait time calculator is further operative to adaptively change the wait time for handling out-of-order packets as channel conditions from the respective data sender to the data receiver improve, based at least on the statistics associated with the out-of-order packets.

In an exemplary aspect, the wait time for receiving retransmissions of lost packets likewise involves several wait factors, including, but not limited to, the average round trip delay, the statistics associated with late and retransmitted packets (including the percentage of late/retransmitted packets, and the average delay associated with such late/retransmitted packets), and the type of picture corresponding to a current frame in which lost packets were detected. In a further exemplary aspect, the wait time calculator is operative to obtain a longer wait time for receiving retransmissions of lost packets if (1) the average round trip delay exceeds a predetermined length of time, and/or (2) the type of picture corresponding to a current frame in which lost packets were detected is an I-frame. The wait time calculator is further operative to model recent statistics associated with late and/or retransmitted packets as a normal (Gaussian) distribution, using an average packet arrival time since a GNACK message was provided to the respective data sender, as well as deviations in packet arrival times. In another exemplary aspect, the wait time for receiving retransmissions of lost packets can be expressed as the sum of a first wait time before a GNACK message is provided to the respective data sender, and a second wait time after the GNACK message is provided to the respective data sender.

In a further exemplary mode of operation, the RTP packet processor can incorporate the wait time for handling out-of-order packets, as well as the wait time for receiving retransmissions of lost packets, into a process of instructing the packet transmitter to provide packet error feedback information to the respective data sender in the form of a GNACK message or a PLI message, as follows. The RTP packet processor obtains, from the wait time calculator, a current system time (also referred to herein as the "$T_{curr}$"), a system time when the last packet was processed (also referred to herein as the "$T_{prev}$"), and a time since the last out-of-order packet was detected (also referred to herein as the "$T_{wait}$"), and sets a wait status variable (also referred to herein as the "wait_status") to "zero". The packet receiver inspects the sequence numbers of the RTP packets stored in the jitter buffer to determine whether there are any lost packets. In the event no packets are determined to be lost, the packet receiver accesses a current RTP packet from the jitter buffer for further processing, and the RTP packet processor sets the wait_status to "zero", and sets the $T_{wait}$ to the difference between the $T_{curr}$ and the $T_{prev}$. The packet receiver then returns to the act of determining whether there are any lost packets. Otherwise, if one or more packets are determined to be lost, then the RTP packet processor determines whether the wait_status is set to zero. In the event the wait_status is determined to be set to zero, the RTP packet processor sets the wait_status to "1", sets the $T_{prev}$ to the $T_{curr}$, and sets the $T_{wait}$ to the difference between the $T_{curr}$ and the $T_{prev}$. The packet receiver then returns to the act of determining whether there are any lost packets.

Otherwise, if the wait_status is determined not to be set to zero, the RTP packet processor determines whether the $T_{wait}$ is less than the wait time for handling out-of-order packets (also referred to herein as the "$T_{first\_wait}$"). In the event the $T_{wait}$ is determined to be less than the $T_{first\_wait}$, the RTP packet processor sets the $T_{wait}$ to the difference between the $T_{curr}$ and the $T_{prev}$. The packet receiver then returns to the act of determining whether there are any lost packets. Otherwise, if the $T_{wait}$ is determined not to be less than the $T_{first\_wait}$, then the RTP packet processor determines whether the $T_{wait}$ is less than the wait time for receiving retransmissions of lost packets (also referred to herein as the "$T_{second\_wait}$"). In the event the $T_{wait}$ is determined not to be less than the $T_{second\_wait}$, the packet receiver accesses the current RTP packet from the jitter buffer for further processing, and the RTP packet processor sets the wait_status to "zero", and sets the $T_{wait}$ to the difference between the $T_{curr}$ and the $T_{prev}$. The packet receiver then returns to the act of determining whether there are any lost packets. Otherwise, if the $T_{wait}$ is determined to be less than the $T_{second\_wait}$, then the RTP packet processor determines whether the wait_status is set to 1. In the event the wait_status is determined not to be set to 1, the RTP packet processor sets the $T_{wait}$ to the difference between the $T_{curr}$ and the $T_{prev}$. The packet receiver then returns to the act of determining whether there are any lost packets. At this point in the process, it is assumed that the data receiver has already provided a GNACK message to the respective data sender.

Otherwise, if the wait_status is determined to be set to 1, then the RTP packet processor determines whether to provide packet error feedback information to the respective data sender in the form of a GNACK message or a PLI message, based at least on the costs associated with providing the respective GNACK and PLI messages. In the event neither a GNACK message nor a PLI message is to be provided to the respective data sender, the packet receiver accesses the current RTP packet from the jitter buffer for further processing, and the RTP packet processor sets the wait_status to "zero", and sets the $T_{wait}$ to the difference between the $T_{curr}$ and the $T_{prev}$. The packet receiver then returns to the act of determining whether there are any lost packets. In the event a GNACK message is determined to be provided to the respective data sender, the RTP packet processor sets the wait_status to "2", instructs the packet transmitter to provide the GNACK message to the respective data sender, and sets the $T_{wait}$ to the difference between the $T_{curr}$ and the $T_{prev}$. The packet receiver then returns to the act of determining whether there are any lost packets. In the event a PLI message is determined to be provided to the data sender, the RTP packet processor instructs the packet transmitter to provide the PLI message to the respective data sender, and sets the wait_status to zero. Further, the packet receiver accesses the current RTP packet from the jitter buffer for further processing, and the RTP packet processor sets the $T_{wait}$ to the difference between the $T_{curr}$ and the $T_{prev}$. The packet receiver then returns to the act of determining whether there are any lost packets.

By handling packet errors associated with multimedia data while taking into account the costs associated with providing specific forms of packet error feedback information in RTCP feedback packets, as well as the wait times for handling out-of-order packets and receiving retransmissions of lost packets, the disclosed systems and methods can more reliably achieve the QoE generally desired and/or required for multimedia data transmissions.

Other features, functions, and aspects of the invention will be evident from the Detailed Description that follows.

BRIEF DESCRIPTION OF THE DRAWINGS

The accompanying drawings, which are incorporated in and constitute a part of this specification, illustrate one or more embodiments described herein and, together with the Detailed Description, explain these embodiments. In the drawings.

DETAILED DESCRIPTION

The disclosure of U.S. patent application Ser. No. 14/186,239 filed Feb. 21, 2014 entitled EFFICIENT PACKET PROCESSING AT VIDEO RECEIVER IN MULTIMEDIA COMMUNICATIONS OVER PACKET NETWORKS is hereby incorporated herein by reference in its entirety.

Systems and methods of handling packet errors associated with multimedia data received at data receivers from data senders are disclosed, in which packet error feedback information is provided by the data receivers to the data senders in one or more real-time transport control protocol (RTCP) feedback packets. In the disclosed systems and methods, the data receivers can calculate, determine, or otherwise obtain costs associated with providing specific forms of packet error feedback information in the RTCP feedback packets, and further calculate, determine, or otherwise obtain wait times for handling out-of-order packets, as well as receiving retransmissions of lost packets. By handling packet errors associated with multimedia data while taking into account such costs and wait times, each of which can have an impact on system bandwidth and/or latency, the disclosed systems and methods can more reliably achieve the quality of experience (QoE) generally desired and/or required for multimedia data transmissions.

Figure 1:
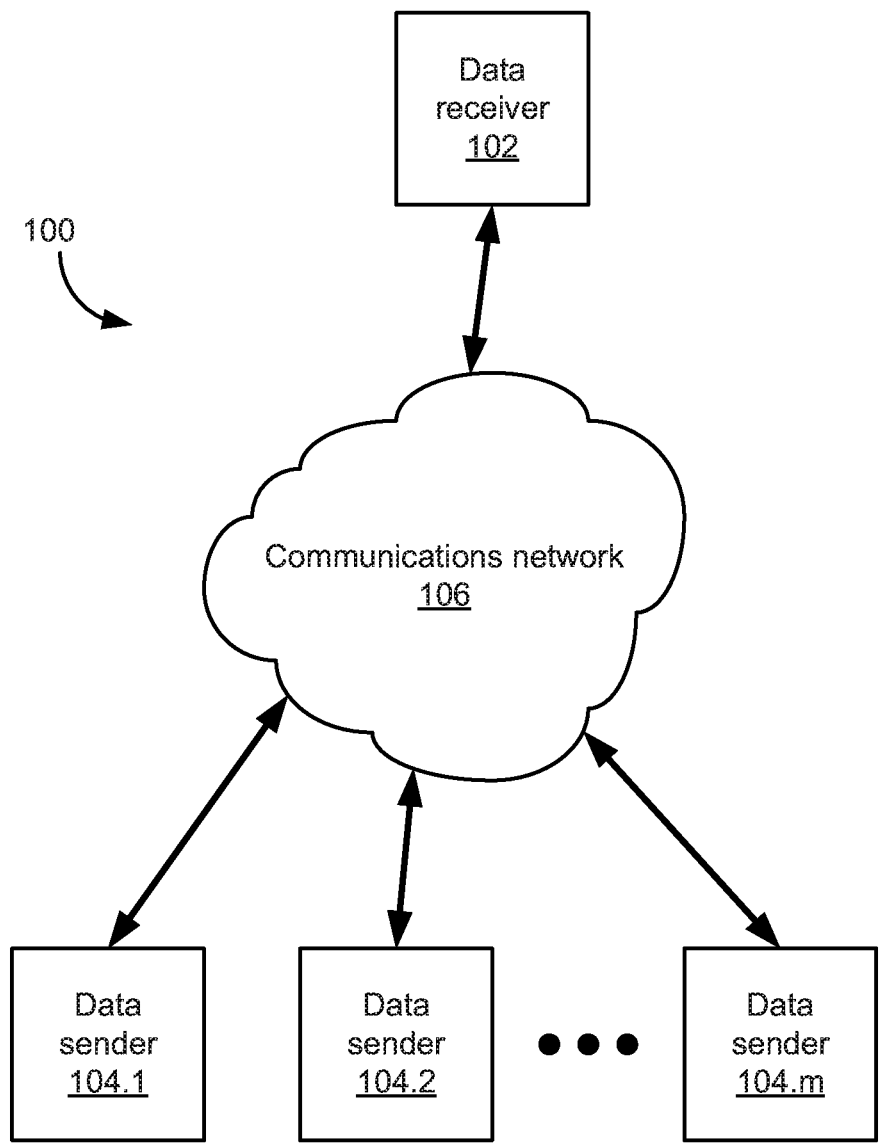
FIG. 1 is a block diagram of an exemplary communications system, including an exemplary multimedia data receiver communicably coupleable to one or more exemplary multimedia data senders over an exemplary communications network, in accordance with the present application.

FIG. 1 depicts an illustrative embodiment of an exemplary system 100 for handling packet errors associated with multimedia data received at data receivers from data senders, in accordance with the present application. As shown in FIG. 1, the system 100 includes a data receiver 102 communicably coupleable to one or more data senders 104.1-104.m over at least one communications network 106. For example, the system 100 may be a video conferencing system, or any other suitable multimedia communications system. Further, the data receiver 102 may be a multipoint control unit (MCU) or any other suitable multimedia communications server or client, and the data senders 104.1-104.m (which, in accordance with the present application, may vary in total number) may be conference participant devices or any other suitable multimedia communications clients or servers.

Figure 2:
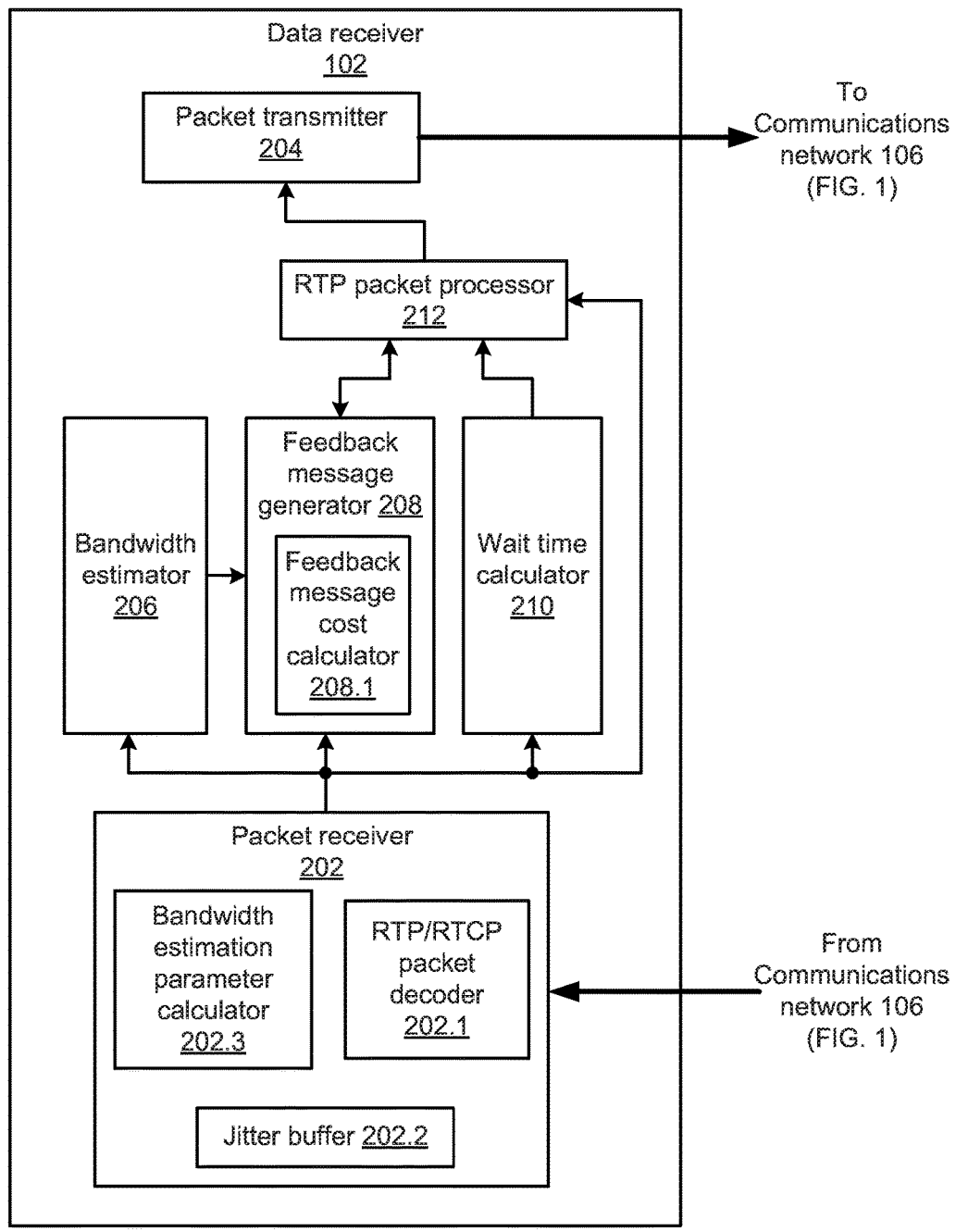
FIG. 2 is a block diagram of the multimedia data receiver of FIG. 1.

FIG. 2 depicts a detailed view of the data receiver 102 of FIG. 1. As shown in FIG. 2, the data receiver 102 includes a packet receiver 202, a packet transmitter 204, a bandwidth estimator 206 for estimating an available bandwidth from a respective one (e.g., the data sender 104.1) of the data senders 104.1-104.m to the data receiver 102, a feedback message generator 208, a wait time calculator 210, and a real-time transport protocol (RTP) packet processor 212. The packet receiver 202 includes an RTP/RTCP packet decoder 202.1, a jitter buffer 202.2, and a bandwidth estimation parameter calculator 202.3. The feedback message generator 208 includes a feedback message cost calculator 208.1.

The disclosed system 100 for handling packet errors associated with multimedia data received at data receivers from data senders will be further understood with reference to the following illustrative example, as well as FIGS. 1-5. In this example, the system 100 (see FIG. 1) performs receptions of multimedia data based on the RTP, and provides packet error feedback relating to such receptions of multimedia data using the RTCP. For example, the data sender 104.1 can send such multimedia data to the data receiver 102 in the form of RTP packets (e.g., video, audio, and/or data RTP packets). Further, the data receiver 102 can receive the RTP packets, and provide packet error feedback information to the data sender 104.1 in the form of RTCP feedback packets. The data sender 104.1 can likewise provide, at a specified RTCP transmission interval, round trip delay information to the data receiver 102 in the form of RTCP sender report (SR) packets. It is noted that the data senders 104.2-104.$m$ can each have a structure and configuration like that of the data sender 104.1.

Having received the RTP packets and one or more RTCP SR packets from the data sender 104.1 (see FIG. 1) at the data receiver 102 (see FIG. 1), the packet receiver 202 (see FIG. 2) employs the RTP/RTCP packet decoder 202.1 (see FIG. 2) for decoding the respective RTP/RTCP SR packets, and further employs the jitter buffer 202.2 (see FIG. 2) for storing at least the decoded RTP packets, each of which has an associated sequence number. The packet receiver 202 inspects the sequence numbers of the decoded RTP packets for detecting, at least at some times, one or more packet errors associated with reception of the respective RTP packets. For example, such packet errors can involve one or more lost packets and/or one or more out-of-order packets. In addition, the packet receiver 202 employs the RTP packets stored in the jitter buffer 202.2 to obtain further information, including, but not limited to, a measure of the fullness of the jitter buffer 202.2 (also referred to herein as the "$F_{jitter\_buffer}$"), an estimate of the time when a next intra-coded frame is expected (also referred to herein as the "$T_{next\_I}$"), the type of picture corresponding to a current frame in which one or more lost packets were detected (also referred to herein as the "$P_{TYPE}$"), statistics associated with out-of-order packets, and statistics associated with late and/or retransmitted packets, and can provide this further information to the feedback message generator 208. For example, the $F_{jitter\_buffer}$ can be calculated as the number of RTP packets stored in the jitter buffer 202.2 divided by the average number of RTP packets received at the data receiver 102 in 1 second, or in any other suitable manner. Further, the $P_{TYPE}$ can be equal to "1" for an I-frame, and "0" otherwise.

Moreover, the packet receiver 202 (see FIG. 2) accesses the round trip delay information provided in the RTCP SR packets by the data sender 104.1 (see FIG. 1). For example, the round trip delay information can include the last SR timestamp, and the delay since last SR. Such round trip delay information is defined in *RTP: A Transport Protocol for Real-Time Applications*, copyright © The Internet Society, July 2003 (the "RTP document"), which is hereby incorporated herein by reference in its entirety.

The bandwidth estimation parameter calculator 202.3 (see FIG. 2) within the packet receiver 202 (see FIG. 2) calculates several bandwidth estimation parameters using the round trip delay information provided in the RTCP SR packets, as well as the RTP packets stored in the jitter buffer 202.2 (see FIG. 2). For example, the bandwidth estimation parameter calculator 202.3 can calculate a current round trip delay and an average round trip delay between the data receiver 102 and the data sender 104.1, using the round trip delay information provided in the RTCP SR packets. It is noted that such a round trip delay can vary, depending upon the locations of the data receiver 102 and the data sender 104.1, the type of communications network(s), the time of day, etc.

Figure 3:
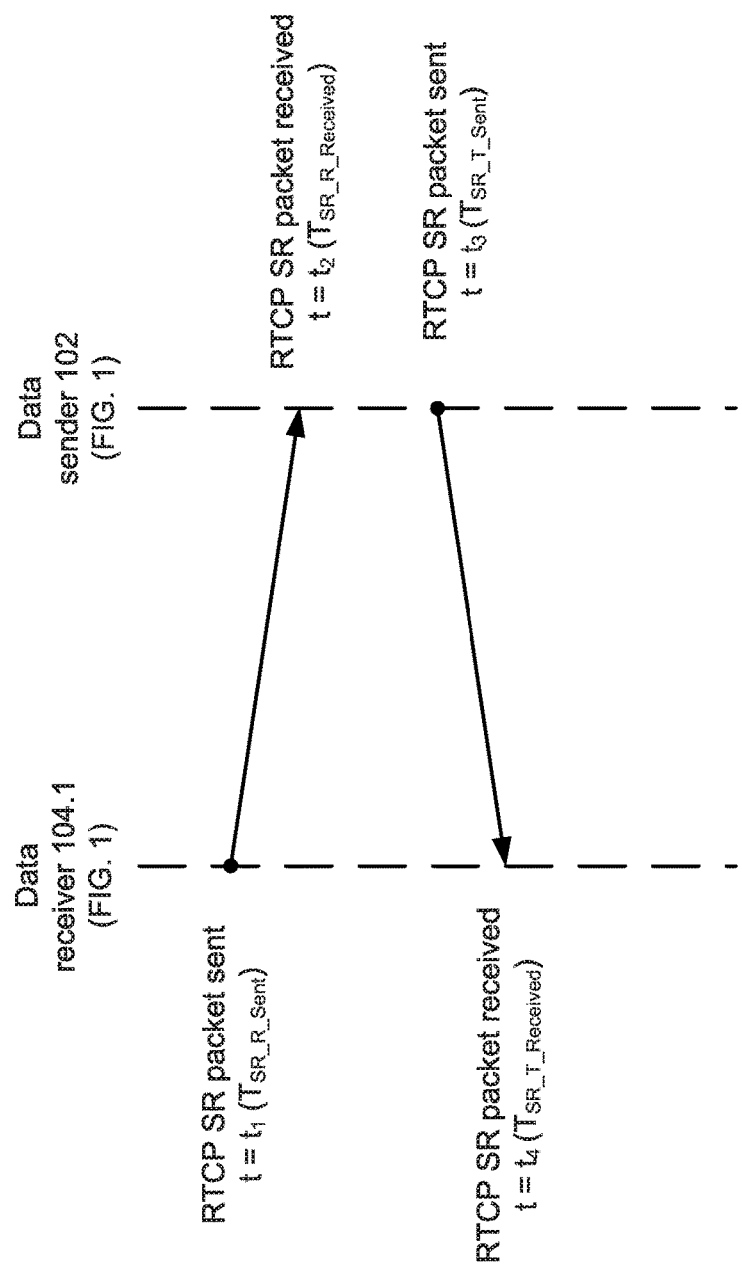
FIG. 3 is a diagram illustrating an exemplary exchange of round trip delay information between the multimedia data receiver of FIG. 2 and a respective one of the multimedia data senders of FIG. 1.

FIG. 3 illustrates an exemplary exchange of RTCP SR packets between the data receiver 102 and the data sender 104.1, illustrating the various time factors used in calculating the round trip delay. With reference to FIG. 3, "$t=t_1$" corresponds to the time ("$T_{SR\_R\_Sent}$") when the data receiver 102 sends an RTCP SR packet to the data sender 104.1, "$t=t_2$" corresponds to the time ("$T_{SR\_R\_Received}$") when the data sender 104.1 receives the RTCP SR packet from the data receiver 102, "$t=t_3$" corresponds to the time ("$T_{SR\_T\_Sent}$") when the data sender 104.1 sends an RTCP SR packet back to the data receiver 102, and "$t=t_4$" corresponds to the time ("$T_{SR\_T\_Received}$") when the data receiver 102 receives the RTCP SR packet from the data sender 104.1. It is noted that the time difference "$t_3-t_2$" corresponds to the delay since last SR ("$D_{SR\_R\_Transmitter}$") at the data sender 104.1. Accordingly, using the various time factors described herein, the round trip delay (also referred to herein as the "$D_{RT}$") can be expressed as follows:

$$D_{RT} = (T_{SR\_T\_Received} - T_{SR\_R\_Sent}) - D_{SR\_R\_Transmitter} \quad (1)$$

Using the round trip delay ($D_{RT}$; see equation (1)), the average round trip delay (also referred to herein as the "$D_{RT\_avg}$") can be expressed as follows:

$$D_{RT\_avg} = a * D_{RT} + (1-a) * D_{RT\_avg} \quad (2)$$

in which "a" can be equal to 0.3, or any other suitable value.

It is noted that, when a current packet loss ratio (also referred to herein as the "$R_{packet\_loss}$") is low (e.g., less than about 1%), the corresponding round trip delay (also referred to herein as the "$D_{RT\_normal}$") can be expressed as follows:

$$D_{RT\_normal} = b * D_{RT} + (1-b) * D_{RT\_normal} \quad (3)$$

in which "b" can be equal to 0.2, or any other suitable value.

In this example, the bandwidth estimation parameter calculator 202.3 (see FIG. 2) calculates the current packet loss ratio and an average packet loss ratio, as well as a multimedia data reception rate at the data receiver 102 (see FIG. 1), using the RTP packets stored in the jitter buffer 202.2 (see FIG. 2). The bandwidth estimation parameter calculator 202.3 is further operative to provide the bandwidth estimation parameters to the bandwidth estimator 206 (see FIG. 2), which uses the bandwidth estimation parameters to obtain an estimate of the available bandwidth from the data sender 104.1 to the data receiver 102 (see FIG. 1). In this example, the bandwidth estimator 206 can set a value of the receiver estimated maximum bitrate (also referred to herein as the "REMB Bitrate") to be equal to the available bandwidth estimate. The REMB Bitrate is defined in *RTCP message for Receiver Estimated Maximum Bitrate*, copyright © 2013 IETF Trust and the persons identified as the document authors, which is hereby incorporated herein by reference in its entirety.

In addition, the bandwidth estimator 206 (see FIG. 2) can determine whether there was any packet loss due to a limitation in the available bandwidth from the data sender 104.1 to the data receiver 102 (see FIG. 1), and provide an indication of such packet loss to the feedback message generator 208 (see FIG. 2). For example, the bandwidth estimator 206 can detect or otherwise determine whether there was any packet loss due to a limitation in the available bandwidth from the data sender 104.1 to the data receiver 102 if a weighted average round trip delay is significantly greater than (e.g., greater than about twice) the normal average round trip delay ($D_{RT\_normal}$; see equation (3)), if the average packet loss ratio is greater than a predetermined packet loss ratio, and/or by any other suitable criteria. Further, the bandwidth estimator 206 can detect or otherwise determine that there was no such packet loss if the weighted average packet loss ratio is less than about 2, or by any other suitable criteria. The bandwidth estimation parameter calculator 202.3 provides the average round trip delay, as well as the average packet loss ratio, to the feedback message generator 208 and the wait time calculator 210.

In this example, the data receiver 102 (see FIG. 1) provides, by the packet transmitter 204 (see FIG. 2), packet error feedback information pertaining to the packet errors associated with the reception of the RTP packets to the data sender 104.1 (see FIG. 1) in one or more RTCP feedback packets. Such packet error feedback information can take the form of a General Negative Acknowledgment (GNACK) message, or a Picture Loss Indication (PLI) message. For example, such a GNACK message may be provided by the data receiver 102 to identify specific packets that have been detected by the packet receiver 202 as being lost, while such a PLI message may be provided by the data receiver 102 to indicate the loss of an unspecified amount of packets, and to request the data sender 104.1 to send an intra-coded frame (also referred to herein as the "I-frame").

Prior to providing such packet error feedback information to the data sender 104.1 (see FIG. 1), the feedback message generator 208 (see FIG. 2) determines costs associated with providing the respective GNACK and PLI messages to the data sender 104.1 (see FIG. 1). The costs associated with providing the GNACK and PLI messages to the data sender 104.1 each involve several cost factors, including, but not limited to, the average round trip delay ($D_{RT\_avg}$), the average packet loss ratio ($R_{packet\_loss}$), the fullness of the jitter buffer ($F_{jitter\_buffer}$), the estimate of the time when the next I-frame is expected ($T_{next\_I}$), and/or the type of picture corresponding to a current frame in which lost packets were detected ($P_{TYPE}$).

In this example, the feedback message cost calculator 208.1 (see FIG. 2) calculates a higher cost for providing a GNACK message to the data sender 104.1 (see FIG. 1) for a longer $D_{RT\_avg}$. In this case, a retransmission of lost packets from the data sender 104.1 may require the data receiver 102 to wait for an unacceptably long period of time. A higher cost for providing a GNACK message to the data sender 104.1 is also calculated if the $R_{packet\_loss}$ exceeds a predetermined percentage value. In this case, there may be many lost packets, and the data receiver 102 may be incapable of receiving all of the lost packets upon retransmission. Further, a higher cost for providing a GNACK message to the data sender 104.1 is calculated if there was packet loss due to a limitation in the available bandwidth from the data sender 104.1 to the data receiver 102, based on the current round trip delay and packet loss ratio. In this case, the retransmission of lost packets may require even more bandwidth from the data sender 104.1 to the data receiver 102. In addition, a higher cost for providing a GNACK message to the data sender 104.1 is calculated if the $F_{jitter\_buffer}$ exceeds a predetermined percentage of the capacity of the jitter buffer. In this case, discontinuities in the RTP packets stored in the jitter buffer 202.2 may indicate the need to retransmit many lost packets. It is noted that the feedback message cost calculator 208.1 calculates a lower cost for providing a GNACK message if the $P_{TYPE}$ is an I-frame.

With further regard to this example, the feedback message cost calculator 208.1 (see FIG. 2) calculates a higher cost for providing a PLI message if there was packet loss due to a limitation in the available bandwidth from the data sender 104.1 to the data receiver 102 (see FIG. 1), based on the current round trip delay and packet loss ratio. In this case, the retransmission of an I-frame may require even more bandwidth from the data sender 104.1 to the data receiver 102. A higher cost for providing a PLI message is also calculated if the $T_{next\_I}$ is less than a predetermined time period, and if the $P_{TYPE}$ is an I-frame.

In view of the various cost factors described herein, the cost (also referred to herein as the "$C_{GNACK}$") associated with providing a GNACK message to the data sender 104.1 (see FIG. 1) can be expressed as a function, f( . . . ), of selected cost factors, as follows:

$$C_{GNACK}=f(D_{RT\_avg}, R_{packet\_loss}, F_{jitter\_buffer}, T_{next\_I}, P_{TYPE}) \quad (4)$$

Likewise, in view of the various cost factors described herein, the cost (also referred to herein as the "$C_{PLI}$") associated with providing a PLI message to the data sender 104.1 (see FIG. 1) can be expressed as a function, g( . . . ), of selected cost factors, as follows:

$$C_{PLI}=g(D_{RT\_avg}, R_{packet\_loss}, F_{jitter\_buffer}, T_{next\_I}, P_{TYPE}) \quad (5)$$

Alternatively, the $C_{GNACK}$ and the $C_{PLI}$ can be expressed as follows:

$$C_{GNACK}=f(D_{RT\_avg}, R_{packet\_loss}, F_{jitter\_buffer}, P_{TYPE}) \quad (6)$$

$$C_{PLI}=g(R_{packet\_loss}, T_{next\_I}, P_{TYPE}) \quad (7)$$

The function, f( . . . ), of selected cost factors, employed in equation (6), may be expressed as follows:

$$C_{GNACK}=THR_{no\_request}+1, \text{if } D_{RT\_avg}>b*D_{RT\_normal} \text{ and } R_{packet\_loss}>c \quad (8a)$$

$$C_{GNACK}=\alpha*R_{packet\_loss}+\beta*F_{jitter\_buffer}+h(D_{RT\_avg})-\gamma*P_{TYPE}, \text{Otherwise} \quad (8b)$$

Further, the function, g( . . . ), of selected cost factors, employed in equation (7), may be expressed as follows:

$$C_{PLI}=THR_{no\_request}+1, \text{if } P_{TYPE} \text{ is an } I\text{-frame} \quad (9a)$$

$$C_{PLI}=\mu/R_{packet\_loss}+\omega/T_{next\_I}, \text{Otherwise} \quad (9b)$$

With regard to equations (8a), (8b), (9a), and (9b), "b", "c", "α", "β", "γ", "μ", and "ω" can be equal to 2, 0.05, 1024, 512, 32, 16, and 128, respectively, or any other suitable values. In addition, "$THR_{no\_request}$" is a predetermined threshold value that can be equal to about 128, or any other suitable value.

It is noted that the function, h( . . . ), in equation (8b) may be expressed as follows:

$$h(D_{RT\_avg})=0, \text{if } D_{RT\_avg}<d \quad (10a)$$

$$h(D_{RT\_avg})=e*(D_{RT\_avg}-d), \text{Otherwise} \quad (10b)$$

in which "d" and "e" can be equal to 0.1 and 48, respectively, or any other suitable values.

A method of providing packet error feedback information to the data sender 104.1 (see FIG. 1) in the form of a GNACK message or a PLI message, based at least on a comparison of the costs $C_{GNACK}$ and $C_{PLI}$ associated with providing the respective GNACK and PLI messages, is described below with reference to FIGS. 1, 2, and 4. As depicted in block 402 (see FIG. 4), the feedback message cost calculator 208.1 (see FIG. 2) calculates the costs $C_{GNACK}$ and $C_{PLI}$ associated with providing a GNACK message and a PLI message, respectively, to the data sender 104.1 (see FIG. 1). As depicted in block 404, the feedback message generator 208 determines whether the cost $C_{GNACK}$ of providing a GNACK message is less than the cost $C_{PLI}$ of providing a PLI message, based at least on the various cost factors described herein. In the event the cost $C_{GNACK}$ of providing a GNACK message is determined to be less than the cost $C_{PLI}$ of providing a PLI message, the feedback message generator 208 determines whether the cost $C_{GNACK}$ of providing a GNACK message is less than the predetermined threshold value, $THR_{no\_request}$, as depicted in block 406. In the event the cost $C_{GNACK}$ of providing a GNACK message is determined to be less than the predetermined threshold value, $THR_{no\_request}$, the feedback message generator 208 directs the RTP packet processor 212 to instruct the packet transmitter 204 to provide the packet error feedback information to the data sender 104.1 in the form of a GNACK message, as depicted in block 410. Otherwise, if the cost $C_{GNACK}$ of providing a GNACK message is determined not to be less than the predetermined threshold value, $THR_{no\_request}$, then the RTP packet processor 212 does not instruct the packet transmitter 204 to provide a GNACK message or a PLI message to the data sender 104.1, as depicted in block 412. Moreover, if the cost $C_{GNACK}$ of providing a GNACK message is determined not to be less than the cost $C_{PLI}$ of providing a PLI message, then the feedback message generator 208 determines whether the cost $C_{PLI}$ of providing a PLI message is less than the predetermined threshold value, $THR_{no\_request}$, as depicted in block 408. In the event the cost $C_{PLI}$ of providing a PLI message is determined to be less than the predetermined threshold value, $THR_{no\_request}$, the feedback message generator 208 directs the RTP packet processor 212 to instruct the packet transmitter 204 to provide the packet error feedback information to the data sender 104.1 in the form of a PLI message, as depicted in block 414. Otherwise, if the cost $C_{PLI}$ of providing a PLI message is determined not to be less than the predetermined threshold value, $THR_{no\_request}$, then the RTP packet processor 212 does not instruct the packet transmitter 204 to provide a GNACK message or a PLI message to the data sender 104.1, as depicted in block 412. It is noted that, although the method of FIG. 4 employs two different forms of feedback messages, namely, a GNACK message and a PLI message, such a method of operation may alternatively employ any other suitable feedback messages, and/or any other suitable number (e.g., one or more) of feedback messages. Further, in the event such a method of operation employs one or more feedback messages, the method of operation may include making a relative comparison of the respective costs associated with providing the feedback messages to a data sender, and/or comparing the costs associated with providing the feedback messages to a data sender with any suitable threshold value(s).

It is noted that, when neither a GNACK message nor a PLI message is provided by the data receiver 102 (see FIG. 1) to the data sender 104.1 (see FIG. 1), the packet receiver 202 (see FIG. 2) can access a current RTP packet from the jitter buffer 202.2 (see FIG. 2) for further processing, and optionally discard any RTP packets subsequently received at the packet receiver 202 (see FIG. 2) that have sequence numbers smaller than that of the current RTP packet. It is further noted that the data receiver 102 can provide a PLI message to the data sender 104.1 if (1) multiple actual packet losses are observed, (2) error concealment capabilities at the data receiver 102 are disabled or unavailable, and/or (3) the $T_{next\_I}$ is greater than a predetermined time period, such as about 1.5 seconds or any other suitable time period.

The wait time calculator 210 (see FIG. 2) determines a first wait time (also referred to herein as the "$T_{first\_wait}$") for handling out-of-order packets, as well as a second wait time (also referred to herein as the "$T_{second\_wait}$") for receiving retransmissions of lost packets, so as to address a tradeoff between the effective packet loss ratio and the overall system latency. The "effective packet loss ratio" is defined herein as the sum of the number of packets lost and the number of unusable packets stored in the jitter buffer divided by the number of packets expected.

The $T_{first\_wait}$ for handling out-of-order packets involves several wait factors, including, but not limited to, the $D_{RT\_avg}$, the statistics associated with the out-of-order packets (including the average percentage of out-of-order packets (also referred to herein as the "$R_{out\_of\_order\_avg}$"), and the average delay associated with such out-of-order packets (also referred to herein as the "$D_{out\_of\_order\_avg}$")), and the $P_{TYPE}$. In this example, the wait time calculator 210 (see FIG. 2) obtains a longer $T_{first\_wait}$ for handling out-of-order packets if the $D_{RT\_avg}$ exceeds a predetermined length of time, and a shorter $T_{first\_wait}$ if the $P_{TYPE}$ corresponding to a current frame in which lost packets were detected is an I-frame. The wait time calculator 210 also adaptively changes the $T_{first\_wait}$ for handling out-of-order packets as channel conditions from the data sender 104.1 to the data receiver 102 improve, based at least on the statistics associated with the out-of-order packets.

In view of the various wait factors described herein, the $T_{first\_wait}$ for handling out-of-order packets can be expressed as a function, p( ... ), of selected wait factors, as follows:

$$T_{first\_wait} = p(D_{RT\_avg}, R_{out\_of\_order\_avg}, D_{out\_of\_order\_avg}, P_{TYPE}) \quad (11)$$

in which "$R_{out\_of\_order\_avg}$" and "$D_{out\_of\_order\_avg}$" can be determined from corresponding currently measured values, "$R_{out\_of\_order}$" and "$D_{out\_of\_order}$", respectively, as follows:

$$R_{out\_of\_order\_avg} = k*R_{out\_of\_order} + (1.0-k)*R_{out\_of\_order\_avg} \quad (12)$$

$$D_{out\_of\_order\_avg} = l*D_{out\_of\_order} + (1.0-l)*D_{out\_of\_order\_avg} \quad (13)$$

in which "k" and "l" can each be equal to 0.2, or any other suitable value(s).

Alternatively, the $T_{first\_wait}$ can be expressed as follows:

$$T_{first\_wait} = (l-\delta*P_{TYPE})*(q(D_{RT\_avg}, D_{out\_of\_order\_avg}) + \rho*R_{out\_of\_order}) \quad (14)$$

in which "$\rho$" and "$\delta$" can be equal to 50 and 0.2, respectively, or any other suitable values. Typically, the $T_{first\_wait}$ can range from 20 milliseconds to 80 milliseconds.

In this example, the function, q( ... ), in equation (14) can be modeled as a normal (Gaussian) distribution, $N(m,\sigma)$, in which "m" and "$\sigma$" correspond to the $D_{out\_of\_order\_avg}$ and its deviation, respectively. It is noted that the deviation, $\sigma$, can have a larger value for a larger $D_{RT\_avg}$. Further, the function, q( ... ), can be made equal to a predetermined time duration, $D_{wait}$, to assure that the probability, P( ... ), of an out-of-order packet arriving at the packet receiver 202 within $D_{wait}$ (in milliseconds) is greater than a predetermined percentage, M %, as follows:

$$q(D_{RT\_avg}, D_{out\_of\_order\_avg}) = D_{wait} \text{ such that } P(D_{out\_of\_order\_avg} < D_{wait}) = M\% \quad (15)$$

in which "M %" can be equal to about 80%, or any other suitable percentage value.

The $T_{second\_wait}$ for receiving retransmissions of lost packets likewise involves several wait factors, including, but not limited to, the $D_{RT\_avg}$, the statistics associated with late and retransmitted packets (including the percentage of late/retransmitted packets, and the average delay associated with such late/retransmitted packets), and the $P_{TYPE}$ corresponding to a current frame in which lost packets were detected. For example, recent statistics of such late and retransmitted packets can be modeled as a normal (Gaussian) distribution, using an average packet arrival time since a GNACK message was provided to the data sender 104.1 and its deviation. Further, to increase the accuracy of such statistics, out-of-order packets that arrive late at the data receiver 102 can be differentiated from retransmitted packets, the model can be updated regressively using a time window and giving more weight to recent statistics, and so-called "outliers" (i.e., very late packets) can be removed entirely from consideration. In this example, the wait time calculator 210 (see FIG. 2) obtains a longer $T_{second\_wait}$ for receiving retransmissions of lost packets if (1) the $D_{RT\_avg}$ exceeds a predetermined length of time, and/or (2) the $P_{TYPE}$ is an I-frame.

Because the $T_{second\_wait}$ for receiving retransmissions of lost packets includes the wait time before the GNACK message is provided to the data sender 104.1 (see FIG. 1) (such a wait time is typically equal to about the $T_{first\_wait}$), the $T_{second\_wait}$ can be expressed as follows:

$$T_{second\_wait} = T_{first\_wait} + T_{after\_request} \quad (16)$$

in which "$T_{after\_request}$" corresponds to the wait time after the GNACK message is provided. For example, the $D_{RT\_avg}$ may be employed to determine the $T_{after\_request}$, as follows:

$$T_{after\_request} = D_{RT\_avg} + \max(\theta, \phi * D_{RT\_avg}) \quad (17)$$

in which "$\theta$" and "$\phi$" can be equal to about 80 milliseconds and 0.3, respectively.

In this example, the retransmitted packet arrival time (also referred to herein as the "$T_{arrival}$") at the packet receiver 202 (see FIG. 2) since the GNACK message was provided to the data sender 104.1 (see FIG. 1) can be modeled as a normal (Gaussian) distribution, $N(m,\sigma)$, in which "m" and "$\sigma$" correspond to the average wait time until the retransmitted packets arrive and its deviation, respectively. It is noted that the $T_{after\_request}$ can be set to assure that the probability, $P(\ldots)$, of the $T_{arrival}$ being less than the $T_{after\_request}$ is greater than a predetermined percentage, N %, as follows:

$$T_{after\_request} \text{ such that } P(T_{arrival} < T_{after\_request}) = N\% \quad (18)$$

in which "N %" can be equal to about 95%, or any other suitable percentage value.

Once the $T_{after\_request}$ is obtained, the wait time calculator 210 (see FIG. 2) can increase the $T_{after\_request}$ if the packets to be retransmitted belong to an I-frame, as follows:

$$T_{after\_request} = \gamma * T_{after\_request} \quad (19)$$

in which "$\gamma$" can be equal to 1.4 for I-frames, and 1.0 otherwise.

Figure 4:
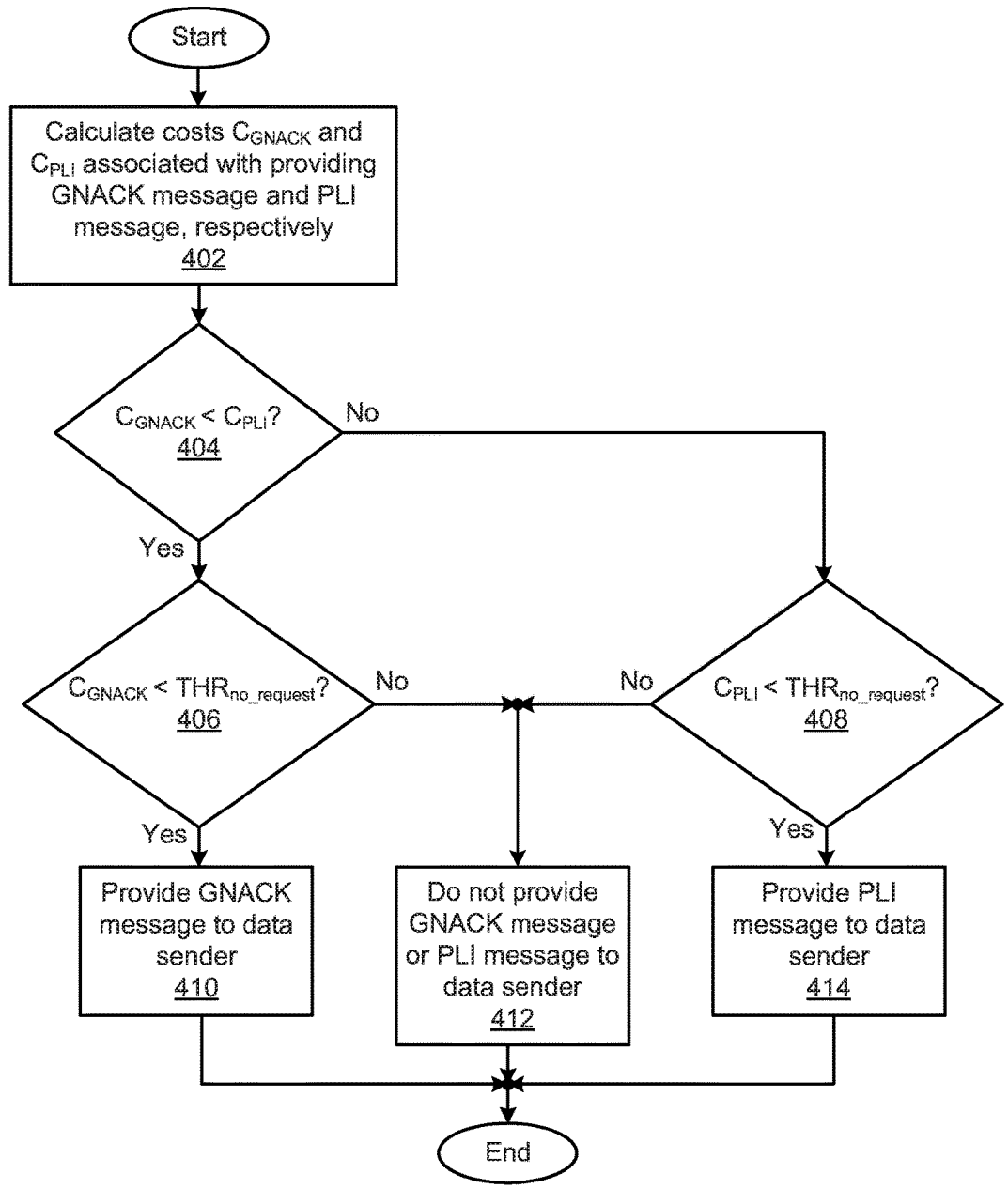
FIG. 4 is a flow diagram illustrating an exemplary method of providing packet error feedback information to the respective multimedia data sender of FIG. 1 in the form of a GNACK message or a PLI message, based on costs associated with providing the respective GNACK and PLI messages.

A method of incorporating wait times for handling out-of-order packets, and receiving retransmissions of lost packets, into the method of FIG. 4 is described below with reference to FIGS. 1, 2, 4, 5a, and 5b. Such wait times include a current system time (also referred to herein as the "$T_{curr}$"), a system time when the last packet was processed (also referred to herein as the "$T_{prev}$"), and a time since the last out-of-order or missing packet was detected (also referred to herein as the "$T_{wait}$"). The packet receiver 202 (see FIG. 2) inspects the sequence numbers of the RTP packets stored in the jitter buffer 202.2 (block 502; see FIG. 5a), to determine whether there are any lost or missing packets (block 508; see FIG. 5a). In the event no packets are determined to be lost or missing, the RTP packet processor 212 (see FIG. 2) sets a wait status variable (also referred to herein as the "wait_status") to "zero" (0) (block 510; see FIG. 5a), and the packet receiver 202 (see FIG. 2) accesses the current RTP packet from the jitter buffer 202.2 (see FIG. 2) for further processing (block 512; see FIG. 5a). Further, the RTP packet processor 212 (see FIG. 2) sets a wait timer to wait for a total of K milliseconds (e.g., 5 milliseconds or any other suitable time value) (block 506; see FIG. 5a), and sets the $T_{wait}$ to the difference between the $T_{curr}$ and the $T_{prev}$ (block 504; see FIG. 5a). The packet receiver 202 (see FIG. 2) then returns to the act of determining whether there are any lost packets (block 502; see FIG. 5a). Otherwise, if one or more packets are determined to be lost, then the RTP packet processor 212 (see FIG. 2) determines whether the wait_status is set to zero (0) (block 514; see FIG. 5a). In the event the wait_status is determined to be set to zero (0), the RTP packet processor 212 (see FIG. 2) sets the $T_{prev}$ to the $T_{curr}$ (block 516; see FIG. 5a), sets the wait_status to "1" (block 518; see FIG. 5a), sets the wait timer to wait for 5 milliseconds (block 506; see FIG. 5a), and sets the $T_{wait}$ to the difference between the $T_{curr}$ and the $T_{prev}$ (block 504; see FIG. 5a). The packet receiver 202 (see FIG. 2) then returns to the act of determining whether there are any lost packets (block 502; see FIG. 5a).

Figure 5A:
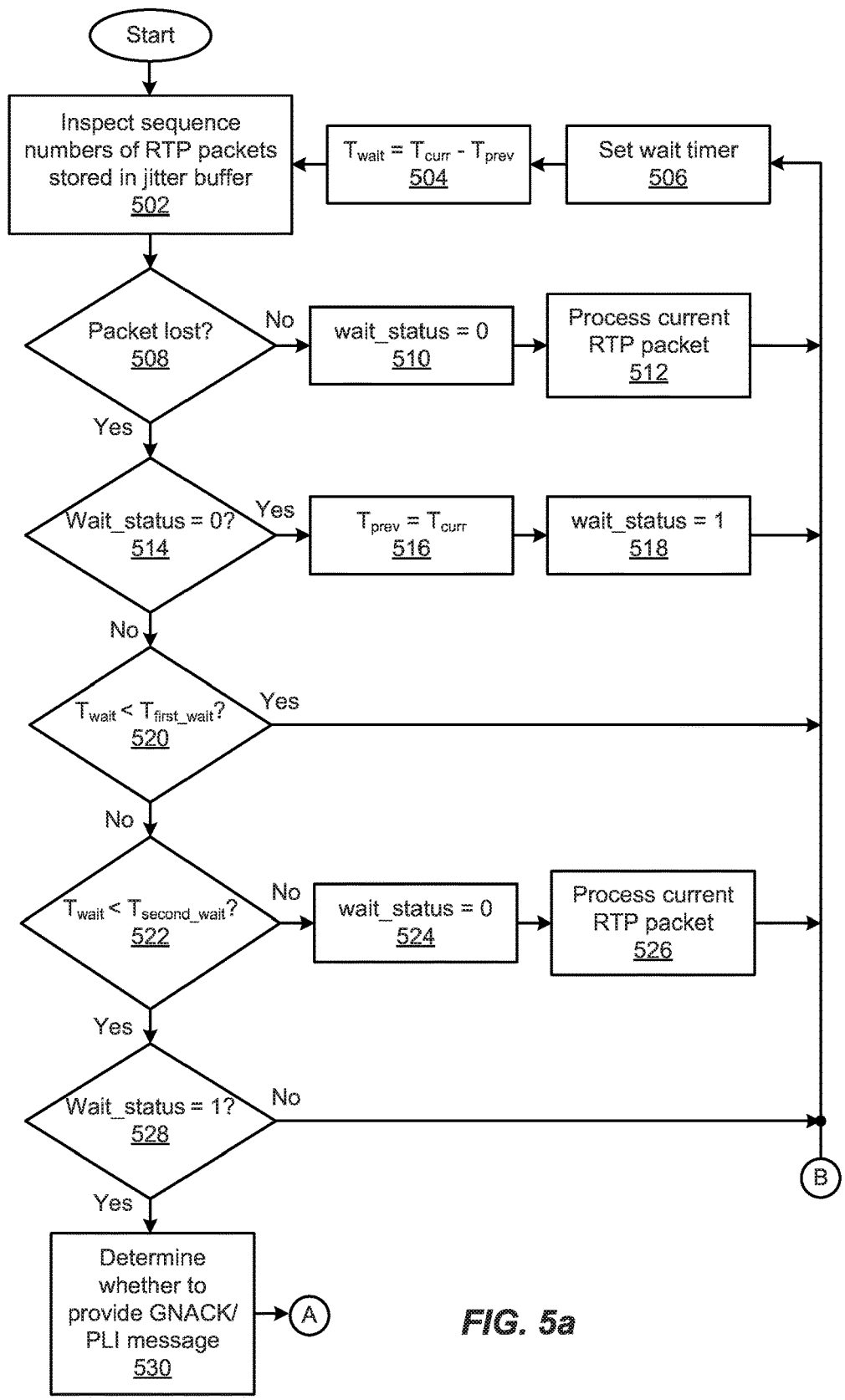
FIGS. 5a and 5b depict a flow diagram illustrating an exemplary method of incorporating wait times for handling out-of-order packets, and for receiving retransmissions of lost packets, into the method of FIG. 4.
Figure 5B:
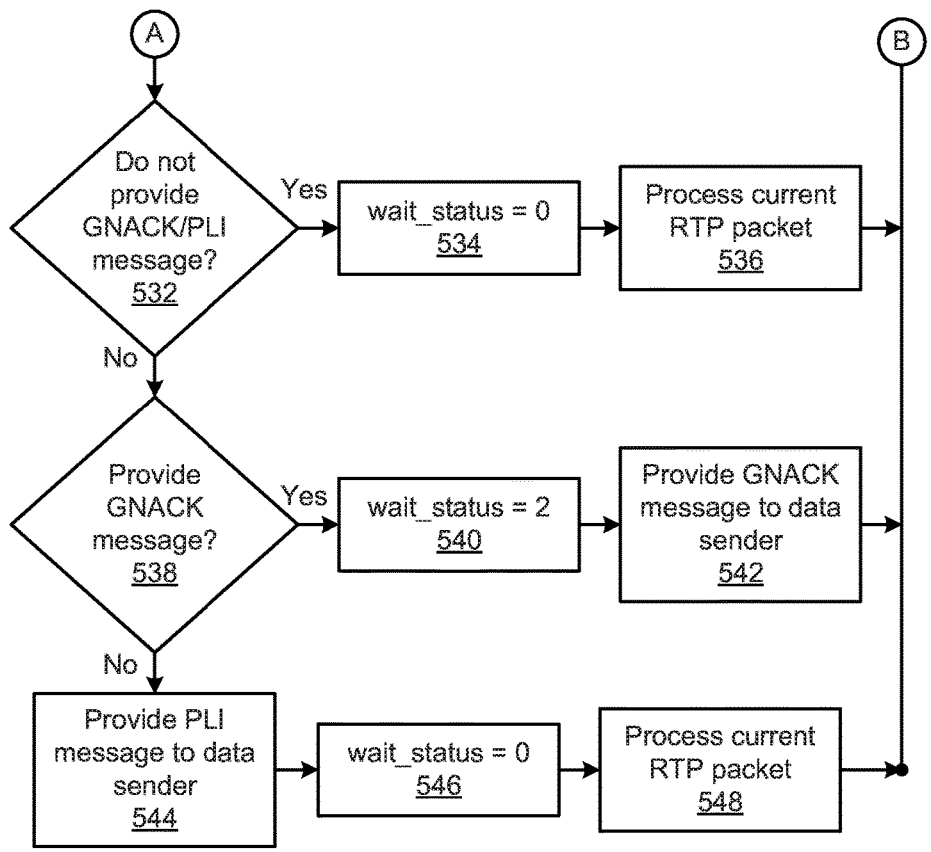

Otherwise, if the wait_status is determined not to be set to zero (0), the RTP packet processor 212 (see FIG. 2) determines whether the $T_{wait}$ is less than the wait time for handling out-of-order packets ($T_{first\_wait}$) (block 520; see FIG. 5a). In the event the $T_{wait}$ is determined to be less than the $T_{first\_wait}$, the RTP packet processor 212 (see FIG. 2) sets the wait timer to wait for 5 milliseconds (block 506; see FIG. 5a), and sets the $T_{wait}$ to the difference between the $T_{curr}$ and the $T_{prev}$ (block 504; see FIG. 5a). The packet receiver 202 (see FIG. 2) then returns to the act of determining whether there are any lost packets (block 502; see FIG. 5a). Otherwise, if the $T_{wait}$ is determined not to be less than the $T_{first\_wait}$, then the RTP packet processor 212 (see FIG. 2) determines whether the $T_{wait}$ is less than the wait time for receiving retransmissions of lost packets ($T_{second\_wait}$). In the event the $T_{wait}$ is determined not to be less than the $T_{second\_wait}$, the RTP packet processor 212 (see FIG. 2) sets the wait_status to zero (0) (block 524; see FIG. 5a), and the packet receiver 202 (see FIG. 2) accesses the current RTP packet from the jitter buffer 202.2 (see FIG. 2) for further processing (block 526; see FIG. 5a). Further, the RTP packet processor 212 (see FIG. 2) sets the wait timer to wait for 5 milliseconds (block 506; see FIG. 5a), and sets the $T_{wait}$ to the difference between the $T_{curr}$ and the $T_{prev}$ (block 504; see FIG. 5a). The packet receiver 202 (see FIG. 2) then returns to the act of determining whether there are any lost packets (block 502; see FIG. 5a). Otherwise, if the $T_{wait}$ is determined to be less than the $T_{second\_wait}$, then the RTP packet processor 212 (see FIG. 2) determines whether the wait_status is set to 1 (block 528; see FIG. 5a). In the event the wait_status is determined not to be set to 1, the RTP packet processor 212 (see FIG. 2) sets the wait timer to wait for 5 milliseconds (block 506; see FIG. 5a), and sets the $T_{wait}$ to the difference between the $T_{curr}$ and the $T_{prev}$ (block 504; see FIG. 5a). The packet receiver 202 (see FIG. 2) then returns to the act of determining whether there are any lost packets (block 502; see FIG. 5a). At this point in the process, it is assumed that the data receiver 102 (see FIG. 1) has already provided a GNACK message to the data sender 104.1 (see FIG. 1).

Otherwise, if the wait_status is determined to be set to 1, then the RTP packet processor 212 (see FIG. 2) determines whether to provide packet error feedback information to the data sender 104.1 (see FIG. 1) in the form of a GNACK message or a PLI message, based at least on the costs associated with providing the respective GNACK and PLI messages, in accordance with the method of FIG. 4 (block 530; see FIG. 5a). In the event neither a GNACK message nor a PLI message is determined to be provided to the data sender 104.1 (block 532; see FIG. 5b), the RTP packet processor 212 (see FIG. 2) sets the wait_status to zero (0) (block 534; see FIG. 5b), and the packet receiver 202 (see FIG. 2) accesses the current RTP packet from the jitter buffer 202.2 (see FIG. 2) for further processing (block 536; see FIG. 5b). Further, the RTP packet processor 212 (see FIG. 2) sets the wait timer to wait for 5 milliseconds (block 506; see FIG. 5a), and sets the $T_{wait}$ to the difference between the $T_{curr}$ and the $T_{prev}$ (block 504; see FIG. 5a). The packet receiver 202 (see FIG. 2) then returns to the act of determining whether there are any lost packets (block 502; see FIG. 5a). In the event a GNACK message is determined to be provided to the data sender 104.1 (block 538; see FIG. 5b), the RTP packet processor 212 (see FIG. 2) sets the wait_status to "2" (block 540; see FIG. 5b), and instructs the packet transmitter 204 (see FIG. 2) to provide the GNACK message to the data sender 104.1 (block 542; see FIG. 5b). Further, the RTP packet processor 212 (see FIG. 2) sets the wait timer to wait for 5 milliseconds (block 506; see FIG. 5a), and sets the $T_{wait}$ to the difference between the $T_{curr}$ and the $T_{prev}$ (block 504; see FIG. 5a). The packet receiver 202 (see FIG. 2) then returns to the act of determining whether there are any lost packets (block 502; see FIG. 5a). In the event a PLI message is determined to be provided to the data sender 104.1 (see FIG. 1), the RTP packet processor 212 (see FIG. 2) instructs the packet transmitter 204 (see FIG. 2) to provide the PLI message to the data sender 104.1 (block 544; see FIG. 5b), and sets the wait_status to zero (0) (block 546; see FIG. 5b). Further, the packet receiver 202 (see FIG. 2) accesses the current RTP packet from the jitter buffer 202.2 (see FIG. 2) for further processing (block 548; see FIG. 5b). The RTP packet processor 212 (see FIG. 2) sets the wait timer to wait for 5 milliseconds (block 506; see FIG. 5a), and sets the $T_{wait}$ to the difference between the $T_{curr}$ and the $T_{prev}$ (block 504; see FIG. 5a). The packet receiver 202 (see FIG. 2) then returns to the act of determining whether there are any lost packets (block 502; see FIG. 5a).

The method of incorporating wait times for handling out-of-order packets and receiving retransmissions of lost packets into the method of FIG. 4, as depicted in FIG. 5, is further described below in exemplary pseudo-code.

```
T_wait = T_curr - T_prev;
if (no missing packet)
{
    wait_status = 0;
    Decode current packet. Return.
}
else if ((wait_status == 0) or (T_wait < T_first_wait))
{
    if (wait_status == 0) {
        T_prev = T_curr;
        wait_status = 1;
    }
    Wait. Return.
}
else if ((wait_status == 1) and (T_wait < T_second_wait))
{
Choose next_step among GNACK message, PLI message, or no
feedback message (i.e., "NO_REQUEST"), in accordance
with the method of FIG. 4
    if (next_step == NO_REQUEST) {
        wait_status = 0;
        Process current packet. Return.
        Any late arriving packet(s) having smaller sequence number
            than that of current packet are discarded.
    }
    else if (next_step == GNACK message) {
        wait_status = 2;
        Provide GNACK message. Return.
    }
    else {
```

-continued
```
        wait_status = 0;
        Provide PLI message. Return.
        Any late arriving packet(s) having smaller sequence number
            than that of current packet are discarded.
    }
}
else if (T_wait < T_second_wait)
{Wait. Return.}
else
{
    wait_status = 0;
    Process current packet. Return.
}
```

The operations herein described are purely exemplary and imply no particular order. Further, the operations can be used in any sequence when appropriate and can be partially used. With the above illustrative embodiments in mind, it should be understood that the invention could employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared, and/or otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable media can be used with computer programs written in accordance with the teachings herein, or it may be more convenient to construct a more specialized apparatus to perform the required operations.

The disclosed systems and methods can also be embodied as computer readable code on a computer readable medium. The computer readable medium is any data storage device that can store data, which can be thereafter be read by a computer system. Examples of such computer readable media include hard drives, read-only memory (ROM), random-access memory (RAM), CD-ROMs, CD-Rs, CD-RWs, magnetic tapes, and other optical and non-optical data storage devices. The computer readable media can also be distributed over a network-coupled computer system so that the computer readable code is stored and executed in a distributed fashion.

It will be appreciated by those of ordinary skill in the art that modifications to and variations of the above-described systems and methods may be made without departing from the inventive concepts disclosed herein. Accordingly, the invention should not be viewed as limited except as by the scope and spirit of the appended claims.

What is claimed is:

1. A method of handling packet errors associated with multimedia data received at a multimedia data receiver from a multimedia data sender, comprising:
    detecting, at the multimedia data receiver, one or more packet errors associated with a reception of the multimedia data from the multimedia data sender, the one or more packet errors including one or more out-of-order packets and one or more lost packets;

determining a first wait time for handling the respective out-of-order packets and a second wait time for receiving retransmissions of the respective lost packets;

obtaining a particular time since one of a last out-of-order packet and a last lost packet was detected at the multimedia data receiver;

determining (i) whether the particular time is less than the first wait time, (ii) whether the particular time is greater than or equal to the first wait time but less than the second wait time, and (iii) whether the particular time is greater than or equal to the second wait time;

having determined that the particular time is less than the first wait time, entering a wait period for handling the one or more packet errors;

having determined that the particular time is greater than or equal to the first wait time but less than the second wait time, providing a General Negative Acknowledgment (GNACK) message to the multimedia data sender; and having determined that the particular time is greater than or equal to the second wait time, providing a Picture Loss Indication (PLI) message to the multimedia data sender.

2. The method of claim 1 further comprising:

determining that a predetermined tradeoff between an effective packet loss ratio and an overall latency for multimedia communications is met by the first wait time and the second wait time, wherein the determining that the predetermined tradeoff between the effective packet loss ratio and the overall latency is met includes obtaining the effective packet loss ratio according to a first number of the one or more lost packets, a second number of unusable packets and a third number of expected packets associated with the reception of the multimedia data from the multimedia data sender.

3. The method of claim 1 wherein the determining of the first wait time for handling the respective out-of-order packets includes determining the first wait time based at least on a plurality of wait factors, the plurality of wait factors including an average round trip delay for the multimedia communications and a type of picture corresponding to a current frame in which the one or more lost packets were detected.

4. The method of claim 3 wherein the determining of the first wait time for handling the respective out-of-order packets includes increasing the first wait time for higher values of the average round trip delay.

5. The method of claim 3 wherein the determining of the first wait time for handling the respective out-of-order packets includes decreasing the first wait time if the type of the picture corresponding to the current frame in which the one or more lost packets were detected is an !-frame.

6. The method of claim 3 wherein the determining of the second wait time for receiving the retransmissions of the respective lost packets includes increasing the second wait time for higher values of the average round trip delay.

7. The method of claim 3 wherein the determining of the second wait time for receiving the retransmissions of the respective lost packets includes increasing the second wait time if the type of the picture corresponding to the current frame in which the one or more lost packets were detected is an I-frame.

8. The method of claim 1 wherein the multimedia data includes a current packet stored in a buffer storage, and wherein the method further comprises:

having determined that the particular time is greater than or equal to the second wait time, accessing the current packet from the buffer storage for processing.

9. A system for handling packet errors associated with multimedia data received from a multimedia data sender, comprising:

a packet receiver configured to detect one or more packet errors associated with a reception of the multimedia data from the multimedia data sender, wherein the one or more packet errors include one or more out-of-order packets and one or more lost packets;

a wait time calculator configured to:

determine a first wait time for handling the respective out-of-order packets and a second wait time for receiving retransmissions of the respective lost packets; and obtain a particular time since one of a last out-of-order packet and a last lost packet was detected at the multimedia data receiver;

a packet processor configured to:

determine (i) whether the particular time is less than the first wait time, (ii) whether the particular time is greater than or equal to the first wait time but less than the second wait time, and (iii) whether the particular time is greater than or equal to the second wait time; and having determined that the particular time is less than the first wait time, enter a first wait period for handling the one or more packet errors; and a packet transmitter configured to:

having determined, by the packet processor, that the particular time is greater than or equal to the first wait time but less than the second wait time, transmit a General Negative Acknowledgment (GNACK) message to the multimedia data sender; and having determined, by the packet processor, that the particular time is greater than or equal to the second wait time, transmit a Picture Loss Indication (PLI) message to the multimedia data sender.

10. The system of claim 9 wherein the wait time calculator is further configured to:

determine that a predetermined tradeoff between an effective packet loss ratio and an overall latency for multimedia communications is met by the first wait time and the second wait time; and obtain the effective packet loss ratio according to a first number of the one or more lost packets, a second number of unusable packets, and a third number of expected packets associated with the reception of the multimedia data from the multimedia data sender.

11. The system of claim 9 wherein the wait time calculator is further configured to determine the first wait time based at least on a plurality of wait factors, the plurality of wait factors including an average round trip delay for the multimedia communications and a type of picture corresponding to a current frame in which the one or more lost packets were detected.

12. The system of claim 11 wherein the wait time calculator is further configured to increase the first wait time for higher values of the average round trip delay.

13. The system of claim 11 wherein the wait time calculator is further configured to decrease the first wait time if the type of the picture corresponding to the current frame in which the one or more lost packets were detected is an I-frame.

14. The system of claim 11 wherein the wait time calculator is further configured to increase the second wait time for higher values of the average round trip delay.

15. The system of claim 11 wherein the wait time calculator is further configured to increase the second wait time if the type of the picture corresponding to the current frame in which the one or more lost packets were detected is an I-frame.

16. The system of claim 9 further comprising:
a buffer storage for storing at least a current packet,
wherein the packet processor is further configured to, having determined that the particular time is greater than or equal to the second wait time, access the current packet from the buffer storage for processing.

17. A method of handling packet errors associated with multimedia data received at a multimedia data receiver from a multimedia data sender, comprising:
detecting, at the multimedia data receiver, one or more packet errors associated with reception of the multimedia data from the multimedia data sender, the one or more packet errors including one or more out-of-order packets, one or more lost packets, and one or more unusable packets;
determining a first wait time for handling the respective out-of-order packets and a second wait time for receiving retransmissions of the respective lost packets;
determining an effective packet loss ratio according to a first number of the one or more lost packets, a second number of the one or more unusable packets, and a third number of expected packets associated with the reception of the multimedia data from the multimedia data sender;
determining an overall latency for multimedia communications between the multimedia data receiver and the multimedia data sender; and
determining that a predetermined tradeoff between the effective packet loss ratio and the overall latency is met by the first wait time and the second wait time by:
obtaining a particular time since one of a last out-of-order packet and a last lost packet was detected at the multimedia data receiver;
determining (i) whether the particular time is less than the first wait time, (ii) whether the particular time is greater than or equal to the first wait time but less than the second wait time, and (iii) whether the particular time is greater than or equal to the second wait time;
having determined that the particular time is less than the first wait time, entering a first wait period for handling the one or more packet errors;
having determined that the particular time is greater than or equal to the first wait time but less than the second wait time, providing a General Negative Acknowledgment (GNACK) message to the multimedia data sender; and
having determined that the particular time is greater than or equal to the second wait time, providing a Picture Loss Indication (PLI) message to the multimedia data sender.

18. The method of claim 17 wherein the determining of the effective packet loss ratio includes dividing a sum of the first number of the one or more lost packets and the second number of the one or more unusable packets by the third number of expected packets.

19. The method of claim 17 wherein the multimedia data includes a current packet stored in a buffer storage, and wherein the method further comprises:
having determined that the particular time is greater than or equal to the second wait time, accessing the current packet from the buffer storage for processing.

* * * * *